Nov. 25, 1952 H. C. SMITH ET AL 2,619,273
CONTAINER FEEDING AND FILLING MECHANISM
Filed Oct. 21, 1949 3 Sheets-Sheet 1

Inventors
Haywood C. Smith and
James C. Petrea

By Bacon & Thomas
Attorney

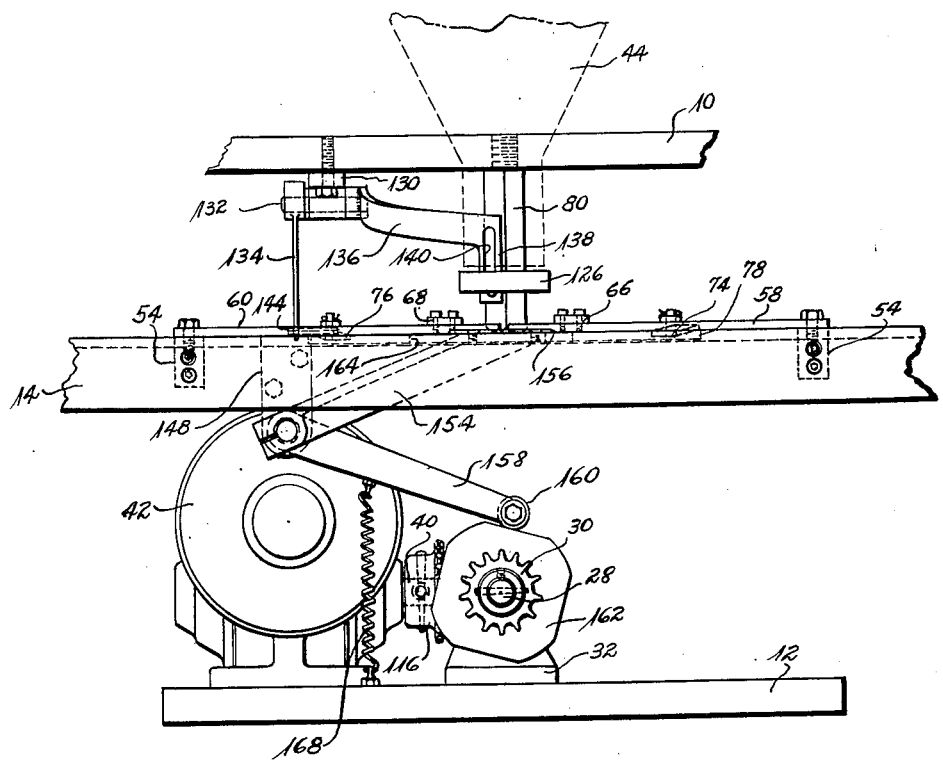

Patented Nov. 25, 1952

2,619,273

UNITED STATES PATENT OFFICE 2,619,273

CONTAINER FEEDING AND FILLING MECHANISM

Haywood C. Smith and James C. Petrea, Durham, N. C., assignors to Wright Machinery Company, Durham, N. C., a corporation of North Carolina Application October 21, 1949, Serial No. 122,772

6 Claims. (Cl. 226—95)

This invention relates to container filling machines and particularly to mechanisms for feeding containers through a filling station in the machine, depositing and settling the material in the containers, and removing the filled containers from the filling station. The particular mechanism illustrated and described by way of example is particularly adapted for use with a weighing machine automatically operable to weigh a predetermined quantity of material to be packaged and to deposit successive weighed portions in suitable containers therefor. The mechanism specifically described was designed for use with a weighing machine to weigh such materials as screws, bolts and the like and to package them in the usual cardboard container. According to the present invention, a weighing machine (not shown) is operable to successively weight equal quantities of the material and to deposit said successive quantities in a suitable hopper having a spout terminating at a filling station. Endless belt means operate continuously through said station to carry containers therethrough and container control means comprising a pair of detents are alternately positionable across the path of movement of containers on said belt. One detent engages the leading container of a line of containers being fed in position to stop it at said filling station and hold said line of containers stationary while the belt continues to slide thereunder, with said leading container at said filling station. Following the filling operation, a second detent is caused to move between said leading container and the remainder of the line of containers while the first detent is withdrawn to release the filled container to the belt and permit its movement out of said filling station. Thereafter, the first detent is again positioned across the belt as the second detent is withdrawn, thus allowing the entire line of containers to advance to position the next leading container at the filling station. The detents are operated by mechanisms driven from a cam shaft that is, in turn, timed to the operation of the entire machine whereby the feeding of the containers occurs cyclically in timed relation to the weighing and dumping cycles of the weighing portion of the machine.

The invention further includes spill preventing means positionable between the end of the spout leading from the hopper and the open top of a container to direct material thereinto and prevent spilling of said material from the container as the container becomes full. The spill-preventing means is operated directly by a part of the mechanism for positioning the detents to thus insure synchronism between removal of the spill preventing means and feeding of the containers during successive cycles of operation.

The invention also includes means for vibrating a container being filled to thereby settle the material in the container. The settling means comprises generally an element defining a flat surface mounted for oscillation and adapted to be "slapped" against the bottom surface of the conveyor belt, at the filling station to vibrate or jar the container being filled to effect settling of material therein.

It is, therefore, an object of this invention to provide a container feeding mechanism automatically operable in timed relation to a material-depositing machine.

Another object of the invention is to provide a container feeding mechanism in a filling machine that is of novel construction and yet simple and economical to produce.

Still another object of the invention is to provide a cyclically operable container feeding mechanism readily adaptable to a conventional flexible belt conveyor without the necessity of providing for interrupting operation of the conveyor.

A still further object of the invention is to provide, in a container filling machine, movable means positionable adjacent the container opening to prevent spilling of material therefrom.

Another object of the invention is to provide such a spill-preventing means movable to and from operable position by and in timed relation to operation of a container feeding mechanism.

Still another object of the invention is to provide a spill-preventing means of relatively few parts, each being of simple construction and economical to produce.

Another object of the invention is to provide a spill-preventer of the type described that may be readily adjusted to accommodate containers of different sizes.

Another object of the invention is to provide a settling means for containers being filled and which is readily adaptable to a conventional endless belt conveyor without material modification of the conveyor structure.

Other objects and advantages of the present invention will become apparent to those skilled in the art as the description of a preferred embodiment proceeds in connection with the accompanying drawings wherein:

Fig. 3 is a front elevational view of the embodiment of Figs. 1 and 2 of the present invention as seen from the left of Fig. 1 but with certain background elements omitted.

Figure 1:
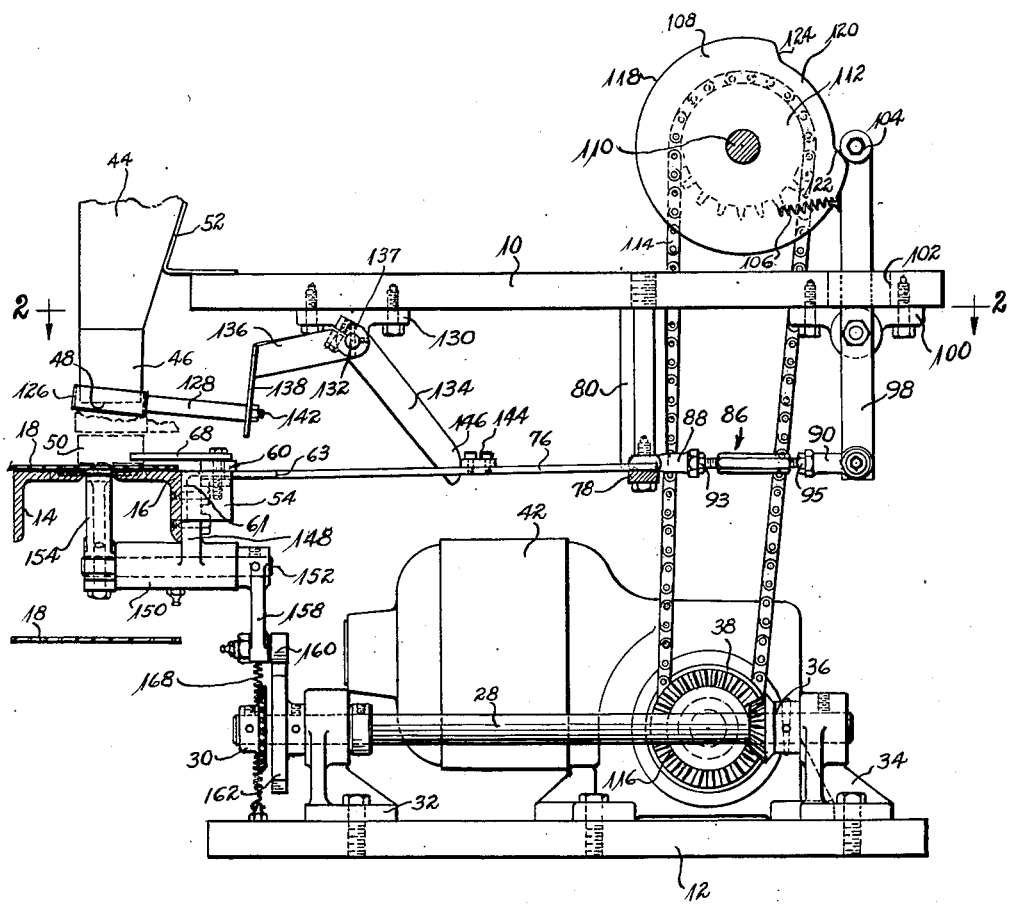
Fig. 1 is a side elevational view of a portion of a machine embodying the present invention, cer

The embodiment of the present invention shown in the drawings is arranged as a portion of a weighing machine having a fixed frame plate 10 and a second frame plate 12 therebelow. Also fixed to the frame of the machine are the angle iron belt guiding and supporting rails 14 and 16. The belt supporting and guiding rails 14 and 16 extend through a container filling station to be later described. An endless conveyor belt 18 is trained over the guide rails 14 and 16 and over rollers 20 at the ends thereof. The rollers 20 (only one of which is shown) are journalled on fixed axes in the machine frame and one of the rollers 20 (shown in Fig. 2) is fixed to a shaft 22 carrying a sprocket wheel 24 driven by a sprocket chain 26 from a shaft 28 having a sprocket wheel 30 fixed thereon. The shaft 28 is shown as journalled in brackets 32 and 34 carried by the lower frame plate 12. A bevel pinion 36 is pinned or otherwise rigidly fixed to the shaft 28 in position to engage a bevel gear 38 fixed to a shaft 40 constituting the output shaft of a geared motor 42. The motor 42 is operated continuously and through the mechanism described will continuously drive the flexible conveyor belt 18 during operation of the machine.

It is contemplated that suitable opposed guide rails be provided above the belt 18 to guide containers being carried by the belt along a predetermined fixed path through the filling station.

The weighing mechanism may constitute a tiltable bucket adapted to receive material from a suitable source and when a predetermined weight of material has been collected in the bucket, it may be caused to tilt and dump that material into a hopper 44 having a spot 46 terminating at 48 above the open top of a container 50 located at the filling station. The terminal of the spout 46 defines the filling station of the machines; that is, the area over the belt 18 but directly below the terminal 48 of the hopper constitutes the filling station. If desired the hopper 44 may be supported by a suitable bracket 52 from the frame plate 10.

Figure 2:
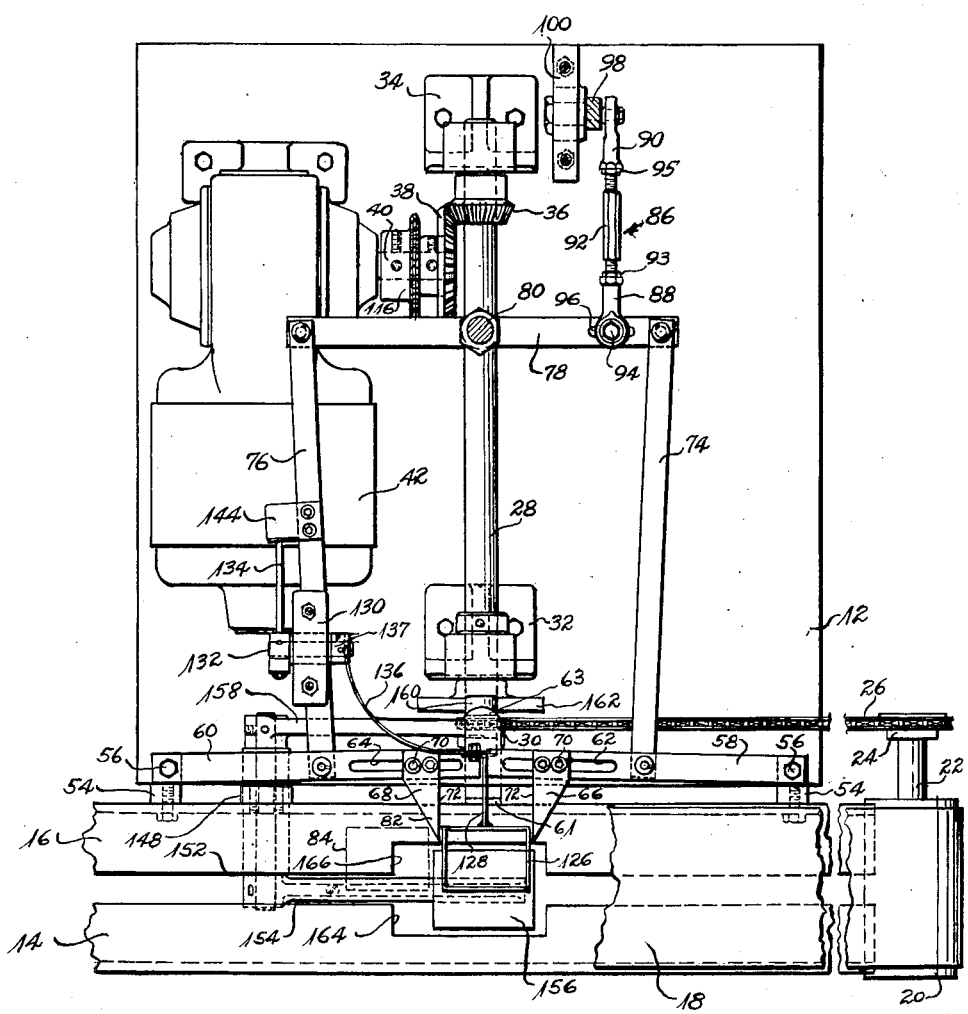
- Fig. 2 is a horizontal sectional view taken substantially along the line 2—2 of Fig. 1, with certain parts being broken away and other parts omitted for clarity of illustration.

A pair of brackets 54 are mounted on the guide rail 16 at one side thereof and define pivot points 56 for a pair of levers 58 and 60. The brackets 54 are spaced a substantial distance apart and pivotally support the levers 58 and 60 to extend toward each other generally parallel to the center line of the endless belt 18. The arms 58 and 60 are shown in Fig. 2 in an intermediate position of oscillation in which they are substantially in direct alignment with each other and their ends terminate short of contact with each other. A central bracket 61 is fixed to the guide rail 16 and is provided with a horizontal portion 63 underlying and slidably supporting the adjacent free ends of the arms 58 and 60. The arms 58 and 60 are provided with slots 62 and 64, respectively, adjacent their free ends with said slots extending longitudinally of the arms. A pair of detents 66 and 68 are attached to the arms 58 and 60, respectively, by means of clamping screws or bolts 70 passing through the slots 62 and 64. By this construction the detents 66 and 68 may be relatively adjusted so that the spacing between their adjacent parallel edges 72 is only slightly greater than the corresponding dimension of the containers to be filled. It will be readily apparent that the detents 66 and 68 may be adjusted to accommodate different sized containers and may be further adjusted to vary the position in which each container is stopped.

A pair of links 74 and 76 are each pivoted at one end to an intermediate portion of the arms 58 and 60, respectively, and are pivoted at their other ends to the opposite ends of a lever 78. The lever 78 is pivotally supported at the lowermost end of a post 80 fixedly attached to the frame plate 10 and directed downwardly therefrom to position the lever 78 in a plane parallel to and at about the same elevation as the plane of the upper flight of belt 18.

From the construction thus far described, it will be apparent that rocking of lever 78 about its pivot at the lowermost end of post 80 will result in reciprocating the links 74 and 76 in opposite directions. When the lever 78 is rocked to oscillate the link 74 forwardly toward the belt 18 the detent 66 carried by arm 58 will be moved over the upper surface of the belt 18, but somewhat spaced therefrom, into position to obstruct the path of movement of containers carried by the belt. The detent 66 will be so adjusted that its edge 72 will engage the leading face of a container and hold that container at the filling station directly below the spout 46 of the hopper 44. Simultaneously with such forward movement of the detent 66, the link 76 will be reciprocated away from the belt 18 to retract the detent 68 completely clear of the path of movement of the containers, thus permitting the line of containers on the belt to advance sufficiently to position the leading container of the line against the face 72 of the detent 66 and in proper position to be filled. When the lever 78 is rocked to advance the link 76 and retract the link 74, it will be clear that the detent 66 will be withdrawn from the path of movement of the containers, thus permitting the filled container to move with the belt 18 to be removed from the filling station. Simultaneously with such retraction of the detent 66 the detent 68 will be projected forwardly across the path of movement of the containers and its pointed free end 82 will be caused to enter between the container just filled at the filling station and the next following empty container 84 on the belt 18, thus holding the empty containers back while the belt 18 is moving the filled container from the filling station. Obviously, the next cycle of operation will retract the detent 68 and project the detent 66 forwardly to position the container 84 at the filling station.

The means for rocking the lever 78 comprises an adjustable link 86 having end portions 88 and 90. The end portion 88 and 90 are suitably bored and threaded and engaged by the threaded ends of a turnbuckle 92 whereby the length of the link 86 may be adjusted as desired. Lock nuts 93 and 95 hold the parts in adjusted position. The end portion 88 of the link 86 is pivoted to the lever 78 at one side of the pivot 80 thereof by means of a suitable pivot pin 94 passing through a slot 96 in the lever 78. Any appropriate means may be provided for fixing the pivot pin 94 in the slot 96 at any desired position longitudinally thereof. The slot 96 provides for adjustment of the pivot pin 94 toward or from the pivot 80 to thus increase or reduce the range of movement of the lever 78 for a given range of reciprocation of the link 86.

The end portion 90 of the link 86 is pivoted to the lowermost end of a generally vertical lever 98 pivoted to a bracket 100 fixed to the frame plate 10. The lever 98 extends upwardly through an opening 102 in the frame plate 10 and its upper end portion is provided with a cam-following roller 104. The cam-following roller 104 is urged by a spring 106 into engagement with a rotary cam 108 rigidly carried by a cam shaft 110. The sprocket wheel 112 is fixed to the driving member of a one-revolution clutch (not shown), both of which are free to turn about shaft 110 and are driven continuously by chain 114 from a sprocket wheel 116 on the motor output shaft 40 previously described. Thus the freely rotating driving member of the one-revolution clutch (not shown) engages its driven member (not shown) fixed to shaft 110, made operative by means similar to that described in co-pending Aldridge patent application, Serial No. 34,188, filed June 21, 1948. Through this means cam shaft 110 is intermittently rotated through the operating cycle of the mechanism and carries other cams (not shown) to control the cycle of operation of other portions of the machine such as the weighing mechanism referred to above.

The cam 108 is provided with a concentric or dwell portion 118 constituting the "high" part of the cam, a lower concentric or dwell portion 120 constituting the "low" part of the cam and suitable connecting portions 122 and 124.

The high part of the cam 118 is of such angular extent that the roller 104 will be on that high portion during the entire weighing and dumping cycle of the weighing mechanism and during the container-filling cycle. While on the high portion 118, the roller 104 will hold the lever 98 and associated parts in such position that the detent 66 is projected outwardly to container-holding position and the detent 68 is held retracted, clear of the path of movement of the containers. As the roller 104 moves inwardly on the connecting portion 124, the position of the detents are reversed and held in such reverse position, since roller 104 is then on the concentric portion 120, for a sufficient period of time to enable the belt 18 to completely remove the filled container from the filling station. The roller then moves outwardly along connecting portion 122 to position the parts to stop the next empty container at the filling station and commence a new filling cycle.

During the filling operation material dropping through the hopper 44 and spout 46 will fall into container 50 (Fig. 1) until the container is practically full, at which time some of the material would quite probably spill out of the container onto the belt. Such spilling is particularly probable when the material comprises bolts, screws, nuts or the like, which are quite likely to "bounce" out of the container. To prevent such spilling, a spill-preventing means comprising a tubular structure 126 is movably mounted to be positionable to bridge the gap between the terminal 48 of the spout 46 and the open top of the container 50. The tubular member 126 has side walls extending generally vertically and an open top and bottom and is of the same configuration and dimensions as the open top of the containers. The spout 46 may be of any suitable sectional shape, either rectangular or round, but is somewhat smaller in each transverse dimension than the spill-preventing member 126. The tubular spill-preventing member 126 is provided with a rearwardly extending arm 128 welded or otherwise rigidly connected therewith and which terminates in a laterally bent end portion. A bracket 130 fixed to the under side of the frame plate 10 provides a bearing for a shaft 132 having an arm 134 fixed to one end thereof. The other end of the shaft 132, on the other side of bracket 130, has a second arm 136 adjustably fixed thereon by means of a split hub 137. The arm 136 has a downwardly directed portion 138 provided with a vertical slot 140. The laterally bent end of the arm 128 is bolted to the depending portion 138 of arm 136 by means of a bolt 142 or the like passing through the slot 140. By this structure the arm 128 and the spill-preventing member 126 may be vertically adjusted on the arm 138 to accommodate containers of different heights and may be angularly adjusted about the shaft 132. The spill-preventing member 126 and its arm 128 may also be removed and replaced by like structures of different configuration. Clearly, the arm 134 and the arm 136, being rigidly attached to the shaft 132, constitute a bell crank swingable about the axis of the shaft 132 to raise and lower the spill-preventing member 126. The spout 46, being of lesser transverse dimensions than the member 126, will readily telescopically receive the said member 126 thereabout when the latter is in its raised or retracted position somewhat above that shown by full lines in Fig. 1.

The link 76 extending from lever 78 to arm 60 has affixed thereon a laterally projecting lug 144 extending to a position to engage a curved end portion 146 of the arm 134. The weight of the parts constituting the spill-preventing mechanism is such that gravity will tend to rotate these members about the axis of 132 in a counter-clockwise direction, as seen in Fig. 1, and maintain the curved portion 146 of arm 134 in contact with the lug 144 at all times.

As previously described, the detent 68 is projected outwardly across the path of movement of the containers after a container has been filled and while that container is being released to the moving belt 18. During this outward projection of the detent 68, the lug 144 carried by link 76 will operate to lift the spill-preventing member 126 upwardly to retracted position to thereby completely "clear" the filled container 50. When the detent 68 is withdrawn by rearward movement of the link 76, the spill-preventing means will be lowered to the operative position shown by dotted lines in Fig. 1, where its lower edge is substantially coincident with the top of the container then at the filling station. After a container is filled with the requisite weight of material, it quite often happens that some of the material projects upwardly above the top of the container, thus necessitating removal of the spill-preventing member to insure free and unobstructed passage of the filled container from the filling station. The spill-preventing member is further made necessary by the operation of material settling means employed with this mechanism and to be described later. It is, of course, impractical to bring the terminal 48 of the spout 46 to close proximity to the container since it is often desirable to employ containers of different height.

By the preceding description, it will be obvious that the spill-preventing means is brought into operative position and moved to retracted position in time relation to the operation of the container feeding means so that it is retracted while containers are being moved and in operative position during the entire container-filling operation.

It is often necessary to compact or settle material in the container being filled to enable the container to hold the requisite quantity. To accomplish this settling, a vibrating or "slapping" mechanism is provided to periodically cause settling of the material. A bracket 148 is fixed to the belt guide 16 and provides a bearing portion 150 for a shaft 152. At its outermost end the shaft 152 carries an upwardly directed arm 154 having a plate member 156 fixed to its uppermost end and arranged obliquely to the longitudinal axis of the arm 154. The angular relationship between the plate 156 and the arm 154 is such that the plate will lie with its upper surface substantially coincident with the lower surface of the upper flight of belt 18 when the arm is in the raised position indicated in the drawings. An arm 158 is rigidly fixed to the other end of the shaft 152 and carries a cam-following roller 160 at its lowermost or free end and a spring 168 is arranged to urge the roller 160 downwardly. The roller 160 extends into position to engage the periphery of a cam 162 fixed to the shaft 28 between the sprocket wheel 30 and the bracket 32. As the shaft rotates, the cam 162 causes the roller 160 to rise and fall and thereby oscillate the arm 154 and periodically cause the plate 156 to impact or "slap" the surface of belt 18. This "slapping" action is effective to settle material in the container immediately thereabove and properly pack the material in the package. The guides 14 and 16 may be cut away as at 164 and 166, respectively, to expose a sufficiently large area of the under surface of the belt 18 to the action of the settling mechanism. The cut away portions 164 and 166 are, of course, below the filling station.

Although a single specific embodiment of the invention has been shown and described herein, it is to be understood that the invention is not to be limited thereby but incorporates all changes and modifications falling fairly within the scope of the appended claims.

We claim:

1. In a machine for filling open-topped containers, a continuously movable conveyor for moving a line of said containers past a filling station, means for engaging and stopping successive containers at said station and for releasing said successive containers to said conveyor after filling thereof, material delivery means including a spout directed toward the open top of a container at said station but spaced therefrom, spill preventing means comprising an open ended tubular element normally self movable to a position bridging the space between the end of said spout and the open top of said container, said element being mounted for retracting movement from said position to a position telescopically embracing said spout, and lost motion means connecting said spill preventing means to said stopping and releasing means whereby to positively retract said spill preventing means from said position upon release of a container and to release and permit return of said means to said position upon stopping of a container at said station, said spill preventing means being pivotally mounted on an axis transversely spaced from said spout, said lost motion means including an abutment element mounted for reciprocation along a path generally normal to said axis, an arm carried by said spill preventing means, said arm extending into the path of movement of said abutment member whereby movements of said member along said path will positively rock said spill preventing means from said bridging position in timed relation to the releasing of said successive containers.

2. In a container filling machine having a filling station therein and a conveyor for moving containers along a predetermined path through said station, a pair of arms, each arm being pivoted at one end to said machine adjacent said path and extending toward the other arm, each arm having a laterally extending detent adjacent its free end and each of said detents extending toward said path but on opposite sides of said station, and means for alternately swinging said arms to project the said detents across said path, the spacing between said detents being at least equal to the length of one of said containers, the said means for alternately swinging said arms comprising, a lever pivoted intermediate its ends to said machine, a link pivoted to each of said arms, intermediate the ends thereof, said links being pivoted at their other ends to the opposite ends of said lever, respectively, and means for periodically rocking said lever on its pivot, said last-named means comprising a third link pivoted to said lever at one side of the pivot thereof, and cam actuated means for reciprocating said third link.

3. In a container filling machine having a filling station therein and a conveyor for moving containers along a predetermined path through said station, a pair of arms, each arm being pivoted at one end to said machine adjacent said path and extending toward the other arm, each arm having a laterally extending detent adjacent its free end and each of said detents extending toward said path, but on opposite sides of said station, a link pivoted to each of said arms intermediate the ends thereof, and means to simultaneously reciprocate said links in opposite directions to project one of said detents across said path while retracting the other detent to a position clear of said path, spill preventing means movable from a retracted position to a position adjacent a container in said station to guide material to said container, means connecting said spill preventing means to one of said links for actuation thereby whereby said spill preventing means is moved from one of said positions to the other in timed relation to the movement of said detents.

4. A container filling machine as defined in claim 3 wherein said spill preventing means is mounted on one arm of a bell crank pivoted on an axis generally parallel to said path and over said one link, an abutment on said one link, the other arm of said bell crank extending downwardly into engagement with said abutment.

5. A container filling machine as defined in claim 4 wherein said one arm of said bell crank includes a substantially vertically downwardly extending portion, said spill preventing means being carried by and vertically adjustable on said last-named portion to adapt it for use with containers of different heights.

6. In a container filling machine having a filling station therein and a conveyor for moving containers along a predetermined path through said station, a pair of arms, each arm being pivoted at one end to said machine adjacent said path and extending toward the other arm, each arm having a laterally extending detent adjacent its free end and each of said detents extending toward said path but on opposite sides of said station, and means for alternately swinging said arms to project the said detents across said path, the spacing between said detents being at least equal to the length of one of said containers, the said means for alternately swinging said arms comprising, a lever pivoted intermediate its ends to said machine, a link pivoted to each of said arms, intermediate the ends thereof, said links being pivoted at their other ends to the opposite ends of said lever, respectively, and means for periodically rocking said lever on its pivot, said last-named means comprising a third link pivoted to said lever at one side of the pivot thereof, and means for periodically reciprocating said third link through a complete cycle.

HAYWOOD C. SMITH.
JAMES C. PETREA.

REFERENCES CITED

The following references are of record in the file of this patent:

UNITED STATES PATENTS

| Number | Name | Date |
|---|---|---|
| 935,506 | Heybach | Sept. 28, 1909 |
| 1,553,738 | Arey | Sept. 15, 1925 |
| 1,626,375 | Alexanderson | Apr. 26, 1927 |
| 2,010,220 | Cocks | Aug. 6, 1935 |
| 2,041,385 | Lidberg et al. | May 19, 1936 |
| 2,149,461 | Mundy | Mar. 7, 1939 |
| 2,328,401 | Stover | Aug. 31, 1943 |
| 2,333,232 | Bleam et al. | Nov. 2, 1943 |
| 2,352,863 | Robinson | July 4, 1944 |
| 2,416,039 | Albertoli | Feb. 18, 1947 |
| 2,491,826 | Meyers et al. | Dec. 20, 1949 |